US009552345B2

(12) United States Patent
Chen et al.

(10) Patent No.: US 9,552,345 B2
(45) Date of Patent: Jan. 24, 2017

(54) GESTURAL ANNOTATIONS

(71) Applicant: Microsoft Technology Licensing, LLC, Redmond, WA (US)

(72) Inventors: Nicholas Yen-Cherng Chen, Cambridge (GB); Abigail Jane Sellen, Cambridge (GB); Dongwook Yoon, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 14/192,936

(22) Filed: Feb. 28, 2014

(65) Prior Publication Data
US 2015/0248388 A1 Sep. 3, 2015

(51) Int. Cl.
*G06F 17/00* (2006.01)
*G06F 17/24* (2006.01)
*H04L 29/06* (2006.01)
*H04L 29/08* (2006.01)
*H04L 12/26* (2006.01)
*G06F 3/0488* (2013.01)

(52) U.S. Cl.
CPC ............. *G06F 17/241* (2013.01); *H04L 43/04* (2013.01); *H04L 65/403* (2013.01); *H04L 67/10* (2013.01); *G06F 3/04883* (2013.01)

(58) Field of Classification Search
CPC .... G06F 3/017; G06F 3/0488; G06F 3/04883; G06F 17/241
See application file for complete search history.

(56) References Cited

U.S. PATENT DOCUMENTS

| 5,625,833 A | 4/1997 | Levine et al. |
| 5,717,879 A | 2/1998 | Moran et al. |
| 2006/0026502 A1 | 2/2006 | Dutta |
| 2011/0179380 A1* | 7/2011 | Shaffer ............... G06F 3/04883 715/781 |

(Continued)

OTHER PUBLICATIONS

Huang, et al., "A Distributed Framework for Collaborative Annotation of Streams", In IEEE International Symposium on Collaborative Technologies and Systems, May 18, 2009, 8 pages.

(Continued)

*Primary Examiner* — Scott Baderman
*Assistant Examiner* — Howard Cortes
(74) *Attorney, Agent, or Firm* — Tom Wong; Micky Minhas

(57) ABSTRACT

Gestural annotation is described, for example where sensors such as touch screens and/or cameras monitor document annotation events made by a user of a document reading and/or writing application. In various examples the document annotation events comprise gestures recognized from the sensor data by a gesture recognition component. For example, the gestures may be in-air gestures or touch screen gestures. In examples, a compressed record of the sensor data is computed using at least the recognized gestures, document state and timestamps. In some examples the compressed record of the sensor data is used to facilitate consumption of the annotation events in relation to the document by a second user. In some examples the sensor data comprises touch sensor data representing electronic ink; and in some examples the sensor data comprises audio data capturing speech of a user.

19 Claims, 15 Drawing Sheets

(56) References Cited

U.S. PATENT DOCUMENTS

| | | | | |
|---|---|---|---|---|
| 2011/0296303 | A1* | 12/2011 | Duquene | H04L 67/1095 715/704 |
| 2012/0060102 | A1* | 3/2012 | Shohfi | G06Q 10/107 715/752 |
| 2012/0089905 | A1 | 4/2012 | Chafy et al. | |
| 2012/0206498 | A1* | 8/2012 | Kai | G06F 3/0482 345/684 |
| 2012/0221576 | A1* | 8/2012 | Marquardt | G06F 17/30144 707/741 |
| 2012/0290907 | A1* | 11/2012 | Smith | G06F 17/30268 715/203 |
| 2013/0054636 | A1* | 2/2013 | Tang | G06F 17/241 707/769 |
| 2013/0262973 | A1 | 10/2013 | Patterson et al. | |
| 2014/0033017 | A1* | 1/2014 | McAfee | G06F 3/14 715/234 |
| 2014/0068498 | A1* | 3/2014 | Olsen | G06F 11/32 715/781 |
| 2014/0118314 | A1* | 5/2014 | Black | G06F 3/03545 345/179 |
| 2014/0122490 | A1* | 5/2014 | Black | G06F 3/038 707/737 |
| 2014/0132571 | A1* | 5/2014 | Zeng | G06F 17/30 345/178 |
| 2014/0347328 | A1* | 11/2014 | Edgecomb | G06F 3/0317 345/179 |
| 2015/0113390 | A1* | 4/2015 | Vagell | G06F 17/212 715/255 |
| 2015/0116283 | A1* | 4/2015 | Black | G06F 3/03545 345/179 |
| 2015/0220504 | A1* | 8/2015 | Bocanegra Alvarez | G06F 17/241 715/233 |
| 2015/0220970 | A1* | 8/2015 | Greenzeiger | G06Q 30/0244 705/14.43 |
| 2015/0228229 | A1* | 8/2015 | Priede | G09G 3/003 345/213 |

OTHER PUBLICATIONS

Apperley, et al., "Lecture Capture using Large Interactive Display Systems", In Proceedings of the International Conference on Computers in Education, Dec. 3, 2002, 5 pages.

Wald, et al., "Synote Mobile", Jun. 24, 2013, Available at: http://eprints.soton.ac.uk/353879/1/synotemobilebangkok5pages.pdf.

Agrawala, et al., "DIZI: A Digital Ink Zooming Interface for Document Annotation", In in Human-Computer Interaction INTERACT, Oct. 2005, 13 pages.

Lucero et al., "An Interactive Support Tool to Convey the Intended Message in Asynchronous Presentations", In Proceedings of the International Conference on Advances in Computer Enterntainment Technology, Oct. 29, 2009, 8 pages.

Monserrat, et al., "NoteVideo: Facilitating Navigation of Blackboard-Style Lecture Videos", In Proceedings of ACM SIGCHI Conference on Human Factors in Computing Systems, Apr. 27, 2013, pp. 1139-1148.

* cited by examiner

| Gesture Set | |
|---|---|
| Scroll and Pan | FIG. 7 |
| Zoom | FIG. 8 |
| Rotate | FIG. 9 |
| Trace | FIG. 10 |

FIG. 6

GESTURAL ANNOTATIONS

BACKGROUND

Gestural interactions play an important role in collaborative scenarios but are difficult to access when work is performed asynchronously. Human computer interaction has evolved with remote desktops and tablet computing devices in respect of computer displayed documents. Such devices enable users in a collaborative environment to work or discuss content virtually and remotely. However, with decentralized workplaces on the rise, many users working on the same document find it difficult to navigate through the document based on visual cues that arise from previous physical interaction between an entity and the document.

The embodiments described below are not limited to implementations which solve any or all of the disadvantages of existing gestural annotation systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Gestural annotation is described, for example where sensors such as touch screens and/or cameras monitor document annotation events made by a user of a document reading and/or writing application. In various examples the document annotation events comprise gestures recognized from the sensor data by a gesture recognition component. For example, the gestures may be in-air gestures or touch screen gestures. In examples, a compressed record of the sensor data is computed using at least the recognized gestures, document state and timestamps. In some examples the compressed record of the sensor data is used to facilitate consumption of the annotation events in relation to the document by a second user. In some examples the sensor data comprises touch sensor data representing electronic ink; and in some examples the sensor data comprises audio data capturing speech of a user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is a chart of an example hand gesture set;

The same reference numerals are used to designate similar parts in the accompanying drawings.

DETAILED DESCRIPTION

Figure 1:
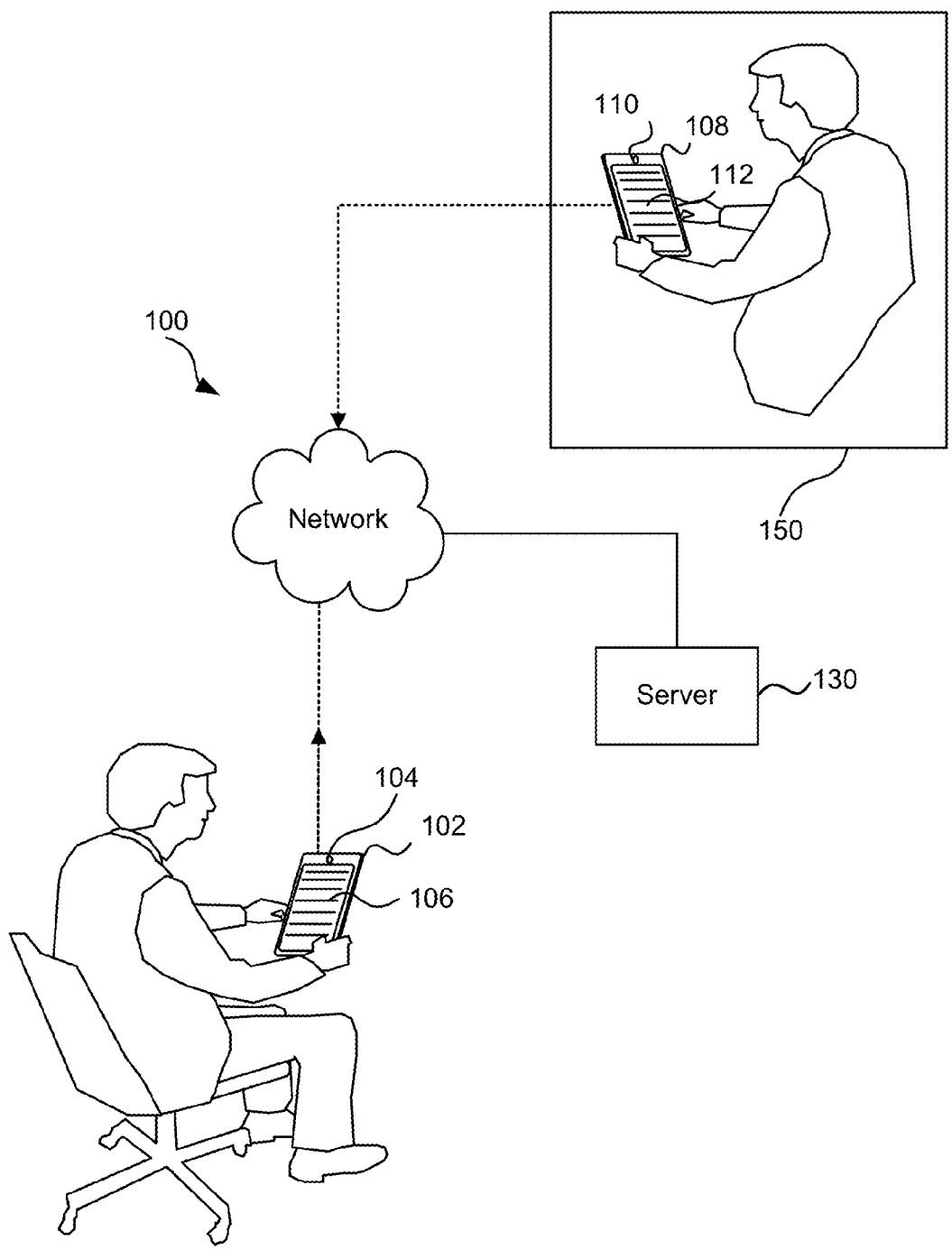
FIG. 1 is a schematic diagram of a system for visualizing and querying gestural annotations.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples described below use mobile computing devices. However, it is also possible to use other types of computing devices such as personal computers in the methods described below.

Gestural interactions play an important role in collaborative scenarios but are difficult to access when work is performed asynchronously. The examples described herein include equipment to sense gestural and optionally also other modalities of annotation that a first user makes to a document. The other modalities may include sound (audio annotations) and digital ink annotations (also known as electronic ink annotations). The equipment (such as a tablet computer) records the sensed data using a compressed record. For example, the raw sensor data may comprise image streams, audio streams, digital ink streams and so may be relatively large in terms of memory requirements. The equipment may compute a compressed record of the sensed data to reduce the memory requirements. The compressed record may be computed in a manner which facilitates consumption of the annotations with respect to the document at a later time, by a second user for example. For example, the compressed record uses new ways of representing gesture data.

The examples below illustrate how gestural annotations to a document may be recorded and associated with a digital document. Collaborators working on the same document are able to browse through or view the annotations at a later time, in a simplified manner. Touch gestures that occur on-screen may be recorded and/or camera technologies may be used to capture mid-air gestures such as facial expressions, hand gestures, head gestures and others.

During consumption of the annotated document interactive overviews of the gestures across the entire document are enabled through the compressed record of sensor data.

In some examples the compressed record of the sensor data is computed so that it comprises thumbnail image locations. The thumbnail images are of parts of the document. The locations are of one or more coverage regions of a gesture with respect to the thumbnail images. In this way, a second user is able to have an "at a glance" view of thumbnail images to quickly assess gestural and other annotations in a document.

In some examples the compressed record of the sensor data comprises locations within the document of one or more presence marks which may be used to indicate presence of a gesture with respect to the document. In this way a second user is able to navigate the gestures using the presence marks without more complete gesture data cluttering the document.

Some types of gestures are recognized by a gesture recognition component as being ones which control manipulation of the document. For example, the compressed record of the sensor data comprises the location and size of a region in the document which associated with one of the recognized gestures, and where that recognized gesture is known to control manipulation of the document in the document reading and/or writing application. For example, a fixed viewpoint mode may be active. In this mode, gestural annotations which comprise gestures that control manipulation of the document are disabled during consumption of the document. They are disabled in that during playback they do not cause manipulation of the document, such as by panning, zooming etc.

In some examples the fixed viewpoint mode is not on. In this case gestural annotations are consumed as view operations. For example, the compressed record of the sensor data comprises identifiers indicating whether the recognised gestures are known to control manipulation of the document in the document reading and/or writing application. If so, then during playback the system plays these gestures back by invoking identical operations on the view of the document as occurred during recording of the annotation. The gestures may be two finger pinch gestures to pan and zoom for example.

In some examples the compressed record of the sensor data comprises identifiers of a plurality of views of the document having associated recognised gestures, the plurality of views of the document together forming a storyboard. The storyboard can be presented during consumption of the annotated document and this gives the second user an overall understanding of the annotations in relation to the document.

During consumption of an annotated document a computing device may: render a document on a display device using output of a document reading and/or writing application which is executing on the computing device or at a remote computing entity in communication with the computing device; access a compressed record of sensor data, the sensor data being from one or more sensors that monitored first user annotation events associated with the rendered document, the compressed record of sensor data comprising information about gestures recognized from the sensor data, state data of the document reading and/or writing application at the time of sensing the sensed data, and timestamps of the sensed data and of the state data; and use the compressed record of sensor data to enable a second user to consume the annotation events in conjunction with the rendered document.

Reference is first made to FIG. 1, which illustrates an example of a visualization and gestural querying system 100 using computer-based mobile devices 102 and 108 for manipulating instances 106 and 112 of a visually displayed digital document. Devices 102 and 108 may take the form of tablet computing devices, smart phones or other devices capable of capturing streams of audio and gestures on a touch screen. In this example, mobile device 108 is at a remote location 150 from mobile device 102 and may be accessing instance 112 of the document asynchronously. By asynchronous access it is meant that device 108 may be accessing instance 112 at a different time to when device 102 accesses instance 106. Devices 102 and 108 may communicate with each other, or via a server, using a communication link. The communication link can be, for example, a wired connection (e.g. USB™, Firewire™, Ethernet™ or similar) and/or a wireless connection (e.g. WiFi™, Bluetooth™ or similar).

In the example of FIG. 1 each user has a computing device with a single display screen. However, it is also possible for one or both of the end user computing devices to have two displays, or for two or more computing devices to be used by a single user. An annotated version of a document may be consumed on one computing device (or display screen) by a first user whilst a second computing device (or display screen) is used by the same user to edit a master copy of the document.

Figure 2:
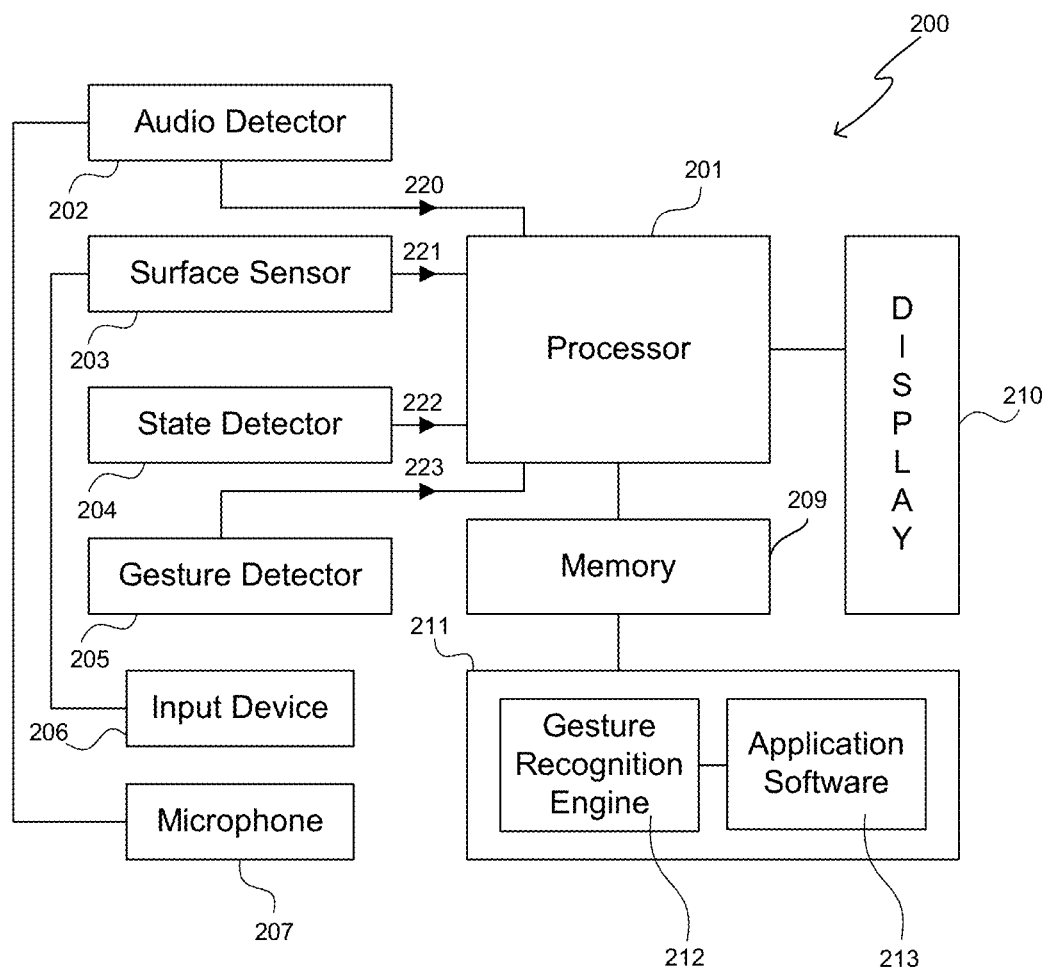
FIG. 2 is a schematic diagram of an example visualizing and querying device used in the system of FIG. 1.

Reference is now made to FIG. 2, which illustrates a schematic diagram of a computer-based mobile device 200 that may be used as devices 106 and 108 in FIG. 1. The device 200 comprises a processor 201 in communication with a surface sensor 203 and a gesture detector 205, and a display 210. The surface sensor 203 is in communication with an input device 206, which may be a sensitive coating on the surface of the display 210, or a pointing device (such as a stylus) that interacts with the processor 201 and display 210 of the device 200 to give rise to a virtual mark on the displayed document, henceforth referred to as digital ink. This gives rise to an ink stream 221 that is fed into processor 201. The gesture detector 205 is capable of capturing gestures made on the surface of the device 200 by the fingers of a user. These gestures give rise to a gesture stream 223 that is input to processor 201. Alternatively, gestures that occur above or in front of the screen of a user's computing device can also be captured as hand gestures. This alternative version of gestures may be captured by integrated 2-D and/or 3-D cameras, such as 104 and 110 in devices 102 and 108 of FIG. 1.

The device 200 also comprises an audio detector 202 and a state detector 204, each of which is coupled to the processor 201. The audio detector 202 communicates with a microphone 207 and serves to record any audio that is present when a gesture is detected. An audio stream 220 is generated by the audio detector and this is fed into the processor 201. The state detector 204 detects the section of the document that is being displayed by the device 200; this information is also input to the processor 201 in the form of a state feed 222.

The processor 201 may be a general purpose microprocessor or a specialised input processor, and is arranged to execute instructions to detect any manipulation of the input device 206 in the form of any of streams 220 to 223. The processor 201 may optionally be arranged to perform processing on detected manipulation of a displayed digital document on device 200.

The device 200 may also include a memory 209 arranged to store the instructions for execution by the processor 201, audio tracks captured by the audio detector 202 in stream 220, instances of digital ink detected by the surface sensor 203 in stream 221, the location within the digital document being displayed as detected by the state detector 204 in stream 222, and traces obtained by the gesture detector 205 in stream 223. In some examples, memory 209 can include random access memory (RAM), read only memory (ROM), cache, Flash memory, a hard disk, or any other suitable storage component. The memory 209 can be a separate component in communication with the processor 201, or integrated into the processor 201.

The instructions stored in the memory 209 may take the form of a recognition engine 212 and application software 213. The recognition engine 212 serves to use the data obtained in streams 221 and 223 relating to digital ink and gestures, respectively, and assign this data to various categories, each of which is associated with an action, as detailed below. The application software 213 contains instructions that support the recognition engine. Additionally, the application software 213 may also be executed by the processor 201 to configure the streams 220 to 223 with the appropriate metadata and timestamps, as detailed below.

The data contained in streams 220 to 223 may be stored on a server that communicates with the processor 201 using a communication link, as will be described below. The communication link can be, for example, a wired connection (e.g. USB™, Firewire™, Ethernet™ or similar) and/or a wireless connection (e.g. WiFi™, Bluetooth™ or similar). The server 208 may be part of the network 140 in FIG. 1.

Figure 3:
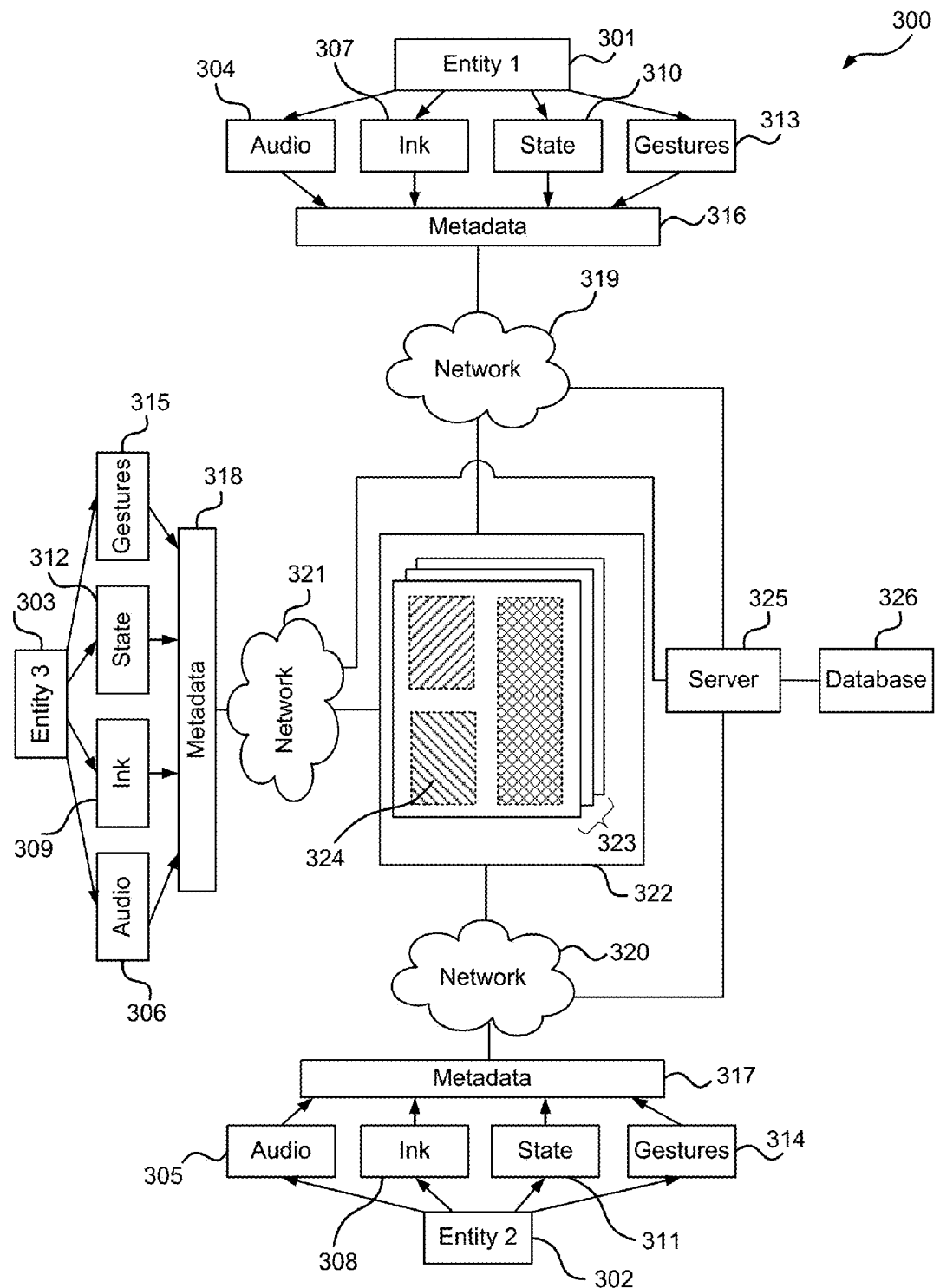
FIG. 3 is a detailed schematic diagram of a system for visualizing and querying gestural annotations of FIG. 1.

Reference is now made to FIG. 3, which illustrates a schematic representation of a collaborative environment with three users, each having their own mobile computing device such as device 200 shown in FIG. 2. For brevity these users and their devices will be referred to henceforth as Entity 1, 2 and 3 (labelled 301 to 303, respectively, in FIG. 3).

As previously described, each of entity 301 to 303 produces four streams of data for audio (304 to 306), digital ink (307 to 308), portion of the digital document being viewed at the relevant point or document state (310 to 312), and gestures made by the user (313 to 315). Each of these data streams cannot be used directly; metadata is appended to each of these streams by the processor of each of the devices used by entities 301 to 303 to produce modified data streams that can then be used. Metadata blocks 316 to 318 are shown in FIG. 3. This metadata comprises, for example, a timestamp (e.g. the date and time at which the data stream was created), the location of creation, and an entity identification tag.

The modified data streams are transmitted to the server 325. This transmission may be over networks 319 to 321 local to each of the entities 301 to 303 via a communication link. The communication link can be, for example, a wired connection (e.g. USB™, Firewire™, Ethernet™ or similar) and/or a wireless connection (e.g. WiFi™, Bluetooth™ or similar). In an example, the local networks 319 to 320 may be the same network. The modified data streams are then stored in a database 326 which can then be queried by any of the entities 301 to 303, or any authorised user, upon accessing the server 325.

Figure 4:
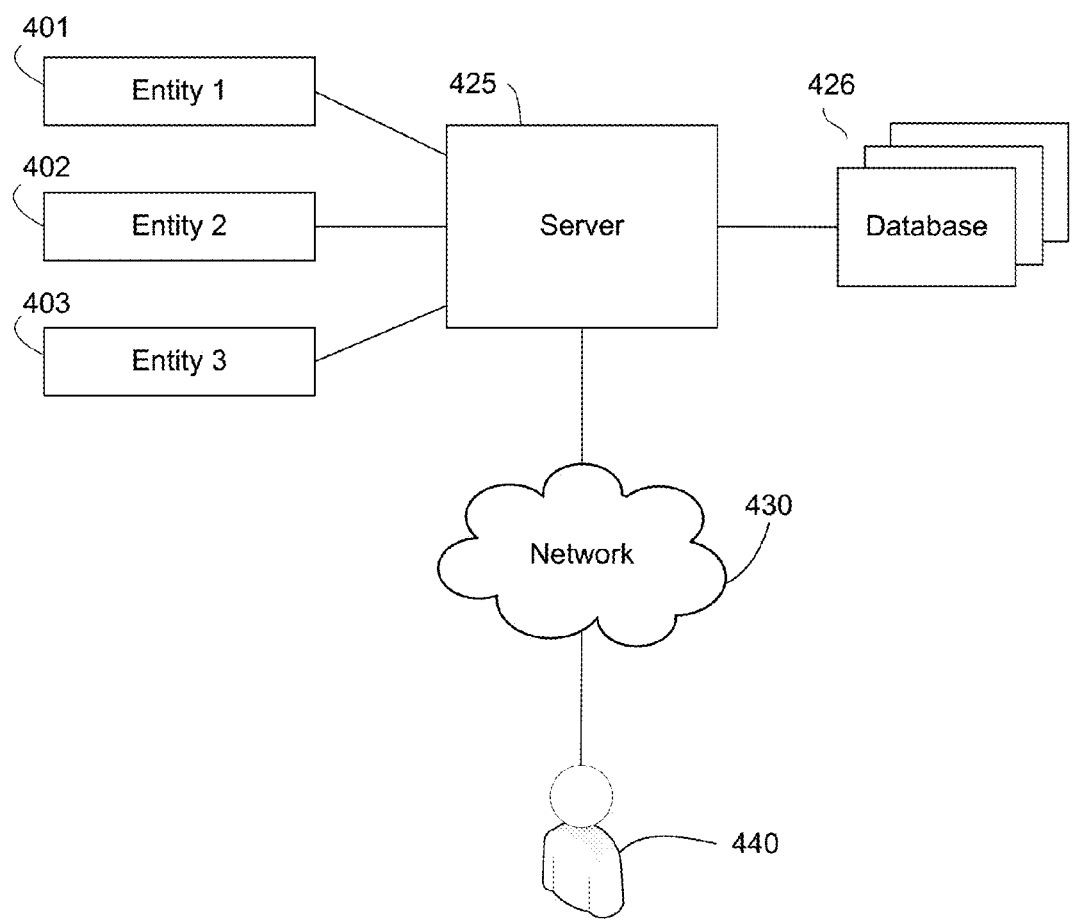
FIG. 4 is a schematic diagram of an example server used in the system of FIG. 1.

This relation between the respective entities and the server is illustrated in FIG. 4 which shows three entities 401 to 403 coupled to a server 425. As in FIG. 3, this coupling may be a communication link, for example, a wired connection (e.g. USB™, Firewire™, Ethernet™ or similar) and/or a wireless connection (e.g. WiFi™, Bluetooth™ or similar). Entities 401 to 403 generate modified data streams as previously described with respect to FIG. 3 which are then communicated to the server 425. The server 425 is similarly coupled to a database 426 which is configured to store the modified data streams generated by entities 401 to 403 so that they can be accessed on demand. For example an authorised user 440 may access any of the data streams by querying the server 425 via a local network 430.

The manipulations on the digital document by each of entities 301 to 303 is displayed in an overlaid manner on screens of devices 200 of authorised users (as previously mentioned, these manipulations are in the form of digital ink, gesture marks, audio and document state). In this manner, the each of the screens of the devices held by each of the authorised users is capable of displaying all the manipulations made to the digital documents by all entities on demand, i.e. asynchronously. An example of such a display is shown as 322 in FIG. 3, illustrating various pages 323 of the digital document being viewed by the entities. Each of the data streams is selectively indicated on the relevant page 323 of the document by shaded regions and/or icons. These indications are shown as 324 in FIG. 3. These indications can be viewed asynchronously by any of the entities 301 to 303, or any authorised user, as will be detailed below.

Figure 5:
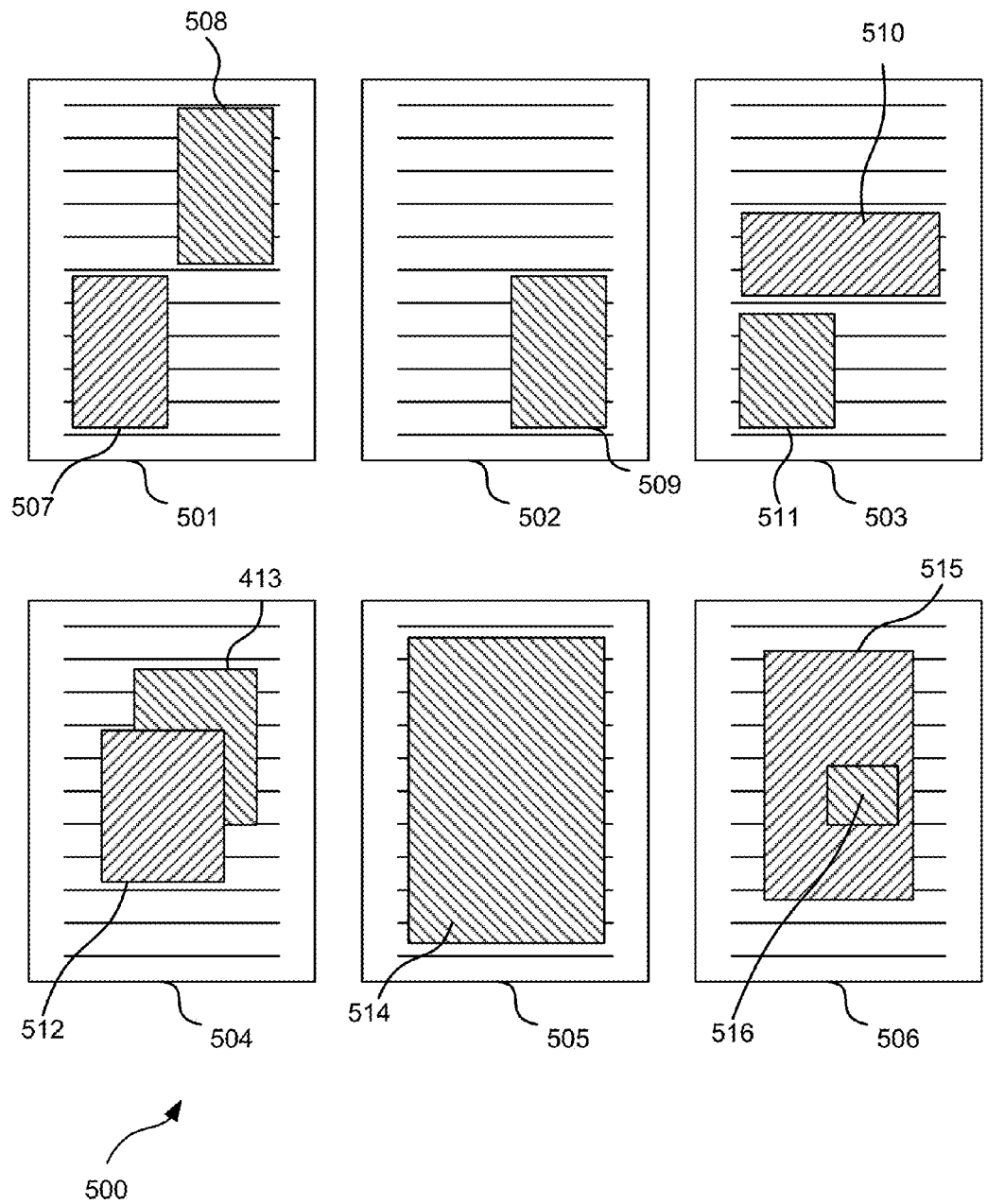
FIG. 5 is a thumbnail set of an overview of a document displayed on a system according to the present invention.

Reference is now made to FIG. 5 which illustrates several views 501 to 506 of a manipulated digital document. Document view 501 shows two shaded portions 507 and 508; these are regions in which manipulations have been made. The different types of shading also inform the user that each of manipulations 507 and 508 have been made by different entities. Document view 502 shows a portion of the document that has been annotated with a manipulation 509. Document view 503 is similar to view 501 in that manipulations made by different entities 510 and 511 are displayed. As described above, the manipulations in views 501 to 506 may have been made by more than one entity using fingers or an input device (e.g. a stylus) thereby creating touch gestural marks and digital ink marks, respectively. Document views 504 and 506 illustrate overlapping manipulations 512, 513, 515 and 516 made by different entities. View 505 shows a single large manipulation 514. The shaded regions 507 to 516 described above indicate to a user that documents 501 to 506 have been manipulated in the course of, for example, a meeting or presentation. These manipulations are in any of the forms described above, i.e. digital ink and gestural marks (audio notes and document states are captured simultaneously, if present).

The number and type of manipulations to be displayed to a user in a document view at any one time can be selected by the user. With reference FIG. 5, a user is presented with a thumbnail view of all manipulations made to a document; he/she can then select to display all manipulations made by a specific entity, or a plurality of entities, as required. In this manner, a user is able to jump directly to the pages of interest without having to navigate through the whole document.

Reference is now made to FIGS. 6 to 10 which describe a gesture set that may be used with the methods and systems described herein. The gesture set describes touch hand gestures and is designed so that the gestures are made on the surface of a mobile device, such as device 200 exemplified in FIG. 2. These gestures give rise to gestural marks and/or digital ink marks. Touch hand gestures relate to a predefined action or movement performed by the user's fingers while in contact with a surface of his/her mobile computing device. Alternatively, gestures that occur above or in front of the screen of a user's computing device can also be captured as hand gestures. This alternative version of gestures may be captured by integrated 2-D and/or 3-D cameras. The surface and gesture detectors in the device (as discussed with reference to FIG. 2) allow the capture of these manipulations. The types of hand gestures that are included in the set are: scroll and pan, zoom, rotate and trace. The gesture set is designed to allow the user to perform gestures while moving his/her fingers on the surface of the mobile computing device. The motions of the fingers allow the user to make gestural marks and/or ink marks as has been previously described. Each of the example touch hand gestures will be described in detail with reference to FIGS. 6 to 10. In the examples shown and described with reference to FIGS. 6 to 10, the computing device is a tablet computing device, however, it will be evident to a person skilled in the art that other computing devices having the features described with reference to FIG. 2 may be used.

Figure 7A:
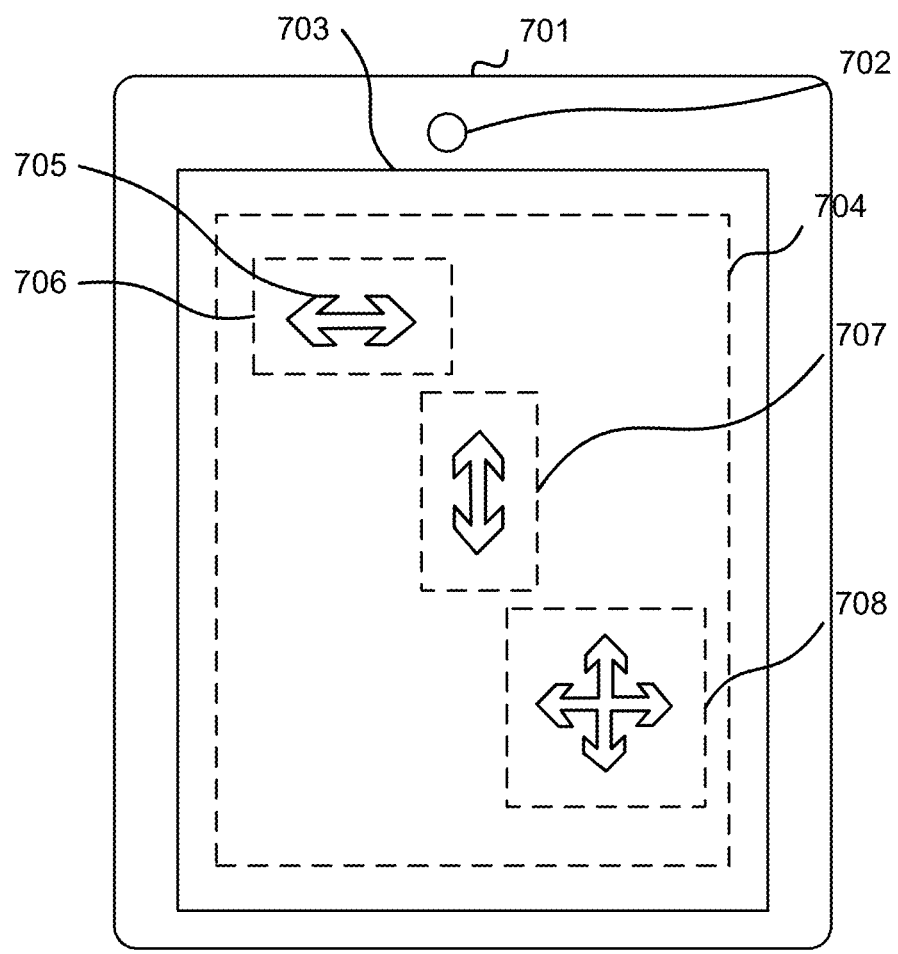
FIG. 7A is a schematic diagram of an example scroll and pan gesture.

Reference is now made to FIG. 7A which illustrates an example scroll and pan gesture. In the example of FIG. 7A, the scroll and pan gesture is accomplished when one or multiple fingers is/are placed on the surface of the screen 703 of the mobile device 701 and moved in a single linear direction (e.g. left, right, up or down). In some examples, the scroll and pan gesture is recognized if the creating entity has moved their finger or fingers at a minimum speed and/or a minimum amount. In these examples the computing-based device 701 may not detect a scroll and pan gesture until the entity's finger(s) has/have moved more than a threshold distance within a predetermined time period. FIG. 7A illustrates scroll and pan gestures 706 to 708 where gesture 706 corresponds to a horizontal/lateral movement (scroll) of the entity's fingers. Gesture 707 corresponds to a transverse/vertical movement (scroll) of the entity's fingers, while gesture 708 corresponds to the entity moving his/her fingers in both directions (panning) in the plane of the screen 703.

Figure 7B:
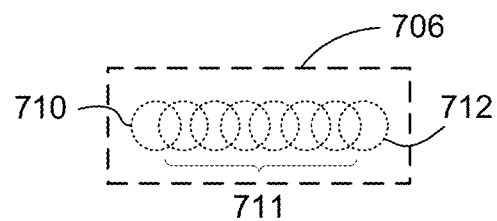
FIG. 7B illustrates the composition of a horizontal scroll gesture.

When the system detects that the creating entity has performed a scroll and pan gesture, the computing-based device 200 captures the start point and end point of the gesture. This is shown in FIG. 7B for a horizontal/lateral scrolling gesture where the start point 710 is captured along with the end point 712. In some examples, intermediary points 711 between the start point 710 and the end point 712 are also captured in the gestural mark.

Figure 8:
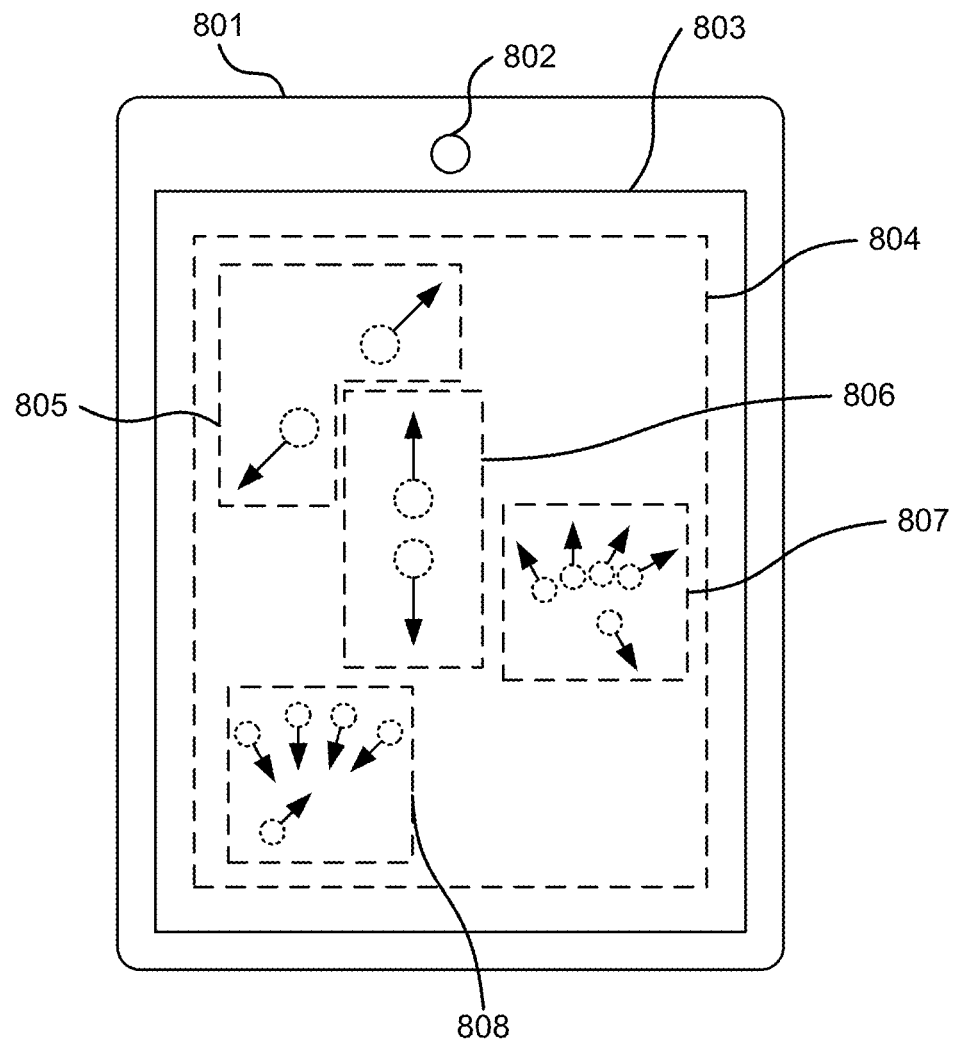
FIG. 8 is a schematic diagram of an example zoom gesture.

A zoom gesture is illustrated in FIG. 8. In this example the zoom gesture is accomplished by making a pinching motion (e.g. bringing two or more fingers together or apart) on the surface of the device 200. This can be accomplished using two or more fingers on one hand or two hands. In some examples, entities can zoom in by bringing their fingers towards one another and zoom out by moving their fingers out from one another. FIG. 8 shows the use of two fingers (e.g. thumb and forefinger) to zoom out gesture 805, the use of two fingers (e.g. one finger on each hand) to zoom in gesture 806, the use of five fingers to zoom out as shown gesture 807, and the use of five fingers to zoom in as shown in gesture 808. The examples 805 to 808 of the zoom gesture shown in FIG. 8 are captured in the same manner as described in the preceding paragraph, i.e. when the system detects that the entity has performed a zoom gesture, the computing-based device 200 captures the start point and end point of the gesture. In some examples, intermediary points between the start point and the end point are also captured in the gestural mark.

In some examples, the speed at which the entity moves their fingers toward or away from one another and/or the size of the zoom gesture performed by the entity controls the amount or quantity of the zoom. In some examples, the slower the fingers are moved toward or away from one other the smaller the zoom. In contrast, the more quickly the fingers are moved toward or away from one another, the larger the zoom.

Figure 9:
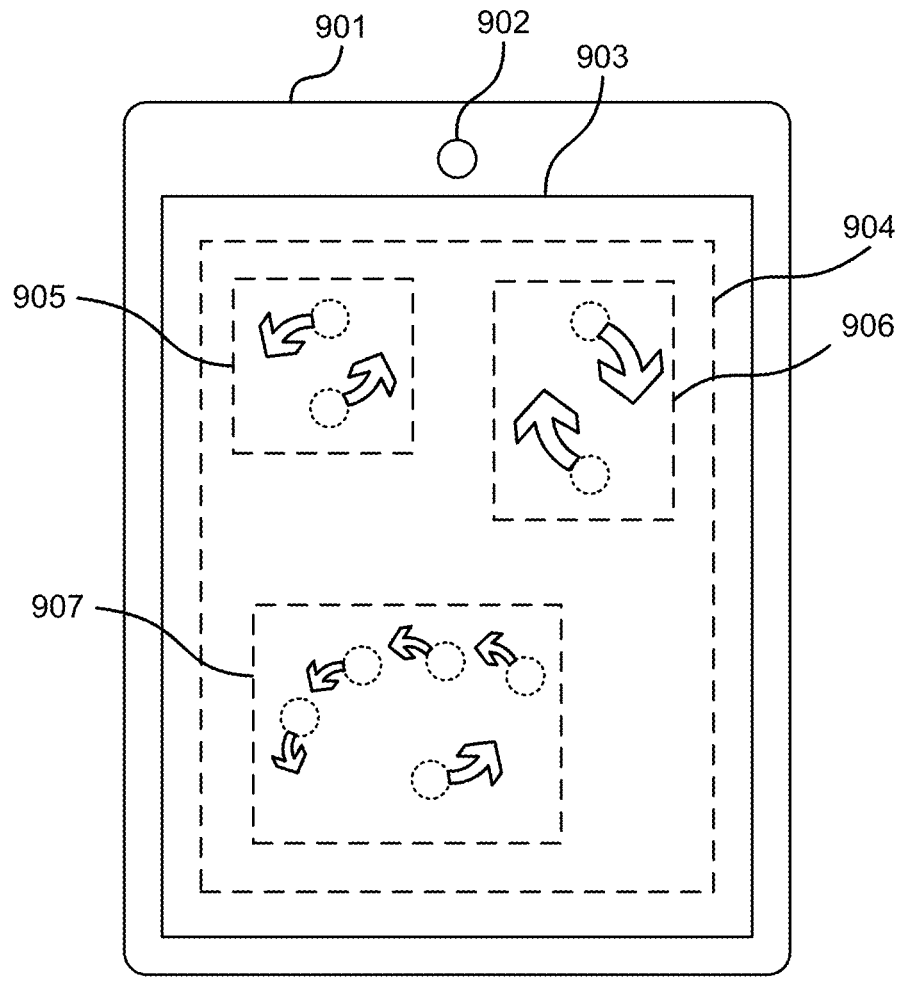
FIG. 9 is a schematic diagram of an example rotate gesture.

Reference is now made to FIG. 9, which illustrates an example rotation gesture. In this example, the rotation gesture is accomplished by putting two or more fingers on the surface of the device 200 and rotating or twisting them in a common direction (e.g. clockwise or counter-clockwise). The fingers may be from the same hand or different hands. FIG. 9 shows the use of two fingers (e.g. thumb and forefinger) to indicate rotation in the counter-clockwise direction 905, the use of two fingers (e.g. thumb and forefinger) to indicate rotation in the clockwise direction 906, and the use of five fingers to indicate rotation in the counter-clockwise direction 907. The gestures in FIG. 9 are captured in the same manner as described in respect to FIG. 7, i.e. when the system detects that the entity has performed a rotate gesture, the computing-based device 200 captures the start point and end point of the gesture. In some examples, intermediary points between the start point and the end point are also captured in the gestural mark.

As with the zoom gestural mark shown in FIG. 8, the speed at which the entity moves their fingers in the respective rotational direction controls the amount or quantity of the rotation. In some examples, the slower the fingers are moved, the smaller angle of rotation in the relevant direction. In contrast, the more quickly the fingers are moved, the larger the angle of rotation.

Figure 10:
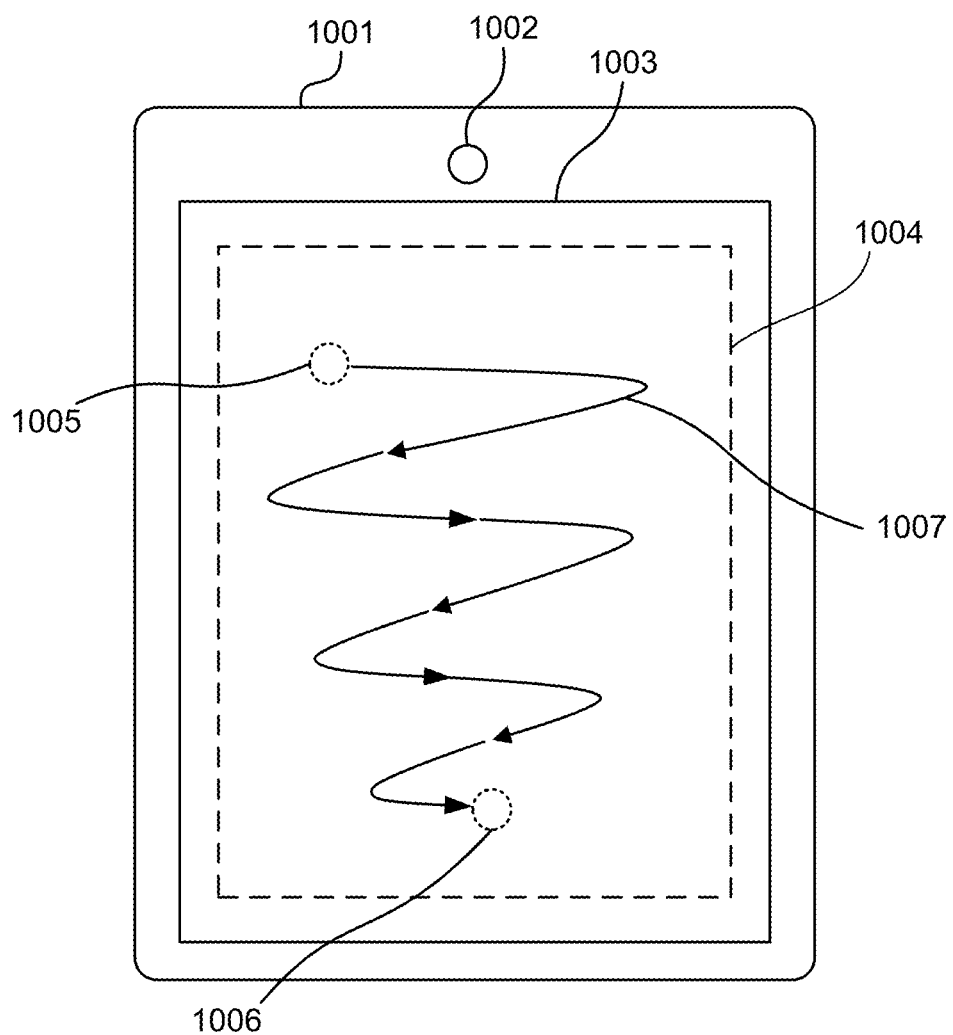
FIG. 10 is a schematic diagram of an example trace gesture.

FIG. 10 shows an example trace manipulation. In this example, the trace is accomplished by the entity placing a finger on a section of the screen of the device 200 and moving it in a particular direction. The example in FIG. 10 shows a snaking pattern 1007 when an entity places his/her finger at a start point 1005 and moves it to end point 1006. The direction of movement of the finger is then captured and displayed graphically, for example, using a fuzzy trail looking a bit like a smoke trail. In respect of the graphical trail (also referred to as a trace), the speed at which the entity moves his/her finger controls thickness of the graphical trail. In some examples, the slower the finger is moved, the thicker the graphical trail. In contrast, the more quickly the finger is moved, the thinner the graphical trail.

Once the modified data streams have been stored in the database, a user (whether one of the entities previously mentioned or an authorised user that was not involved in the creation of the data streams) may access the data stored in these modified streams at any instance. This user may be remotely located. Access may be controlled where a user may be prompted for a login details which may have been assigned to him/her separately. As previously mentioned, the remote user may query the database via a server over a local network.

When a user has gained access to the modified data streams stored in the server, an overview of the document in question is displayed on the user's mobile device, such as device 200 shown in FIG. 2, and takes the form of thumbnails of the pages of the document being viewed. This thumbnail view is similar to views 501 to 506 in FIG. 5 and present simplified representations of manipulations that depict a coverage region over the reduced size thumbnails of each page in the document. These coverage regions are the shaded regions 507 to 515 shown in FIG. 5. As the user hovers over a coverage region, the manipulations that are produced during the same session are highlighted and selected. The overview can also be filtered based on a selected type of manipulation, creator, or date and time criteria to show a reduced set of pages. These filter fields are obtained from the various additional data stored as metadata in the modified data streams from each of the participating entities. From the gestures that are displayed, users can then drill down further to examine gestures in more detail or to play back the recording in which they were created.

Referring back to FIG. 5, if a user views the thumbnails and selects a coverage region, for example, region 507 on thumbnail view 501, all regions created by the same entity are also displayed. Therefore in the example of FIG. 5, regions 510, 512 and 515 on thumbnail views 503, 504 and 506 are also displayed to the user. Page views 502 and 505 are omitted from the selection to reduce clutter in the view presented to the user.

Figure 11:
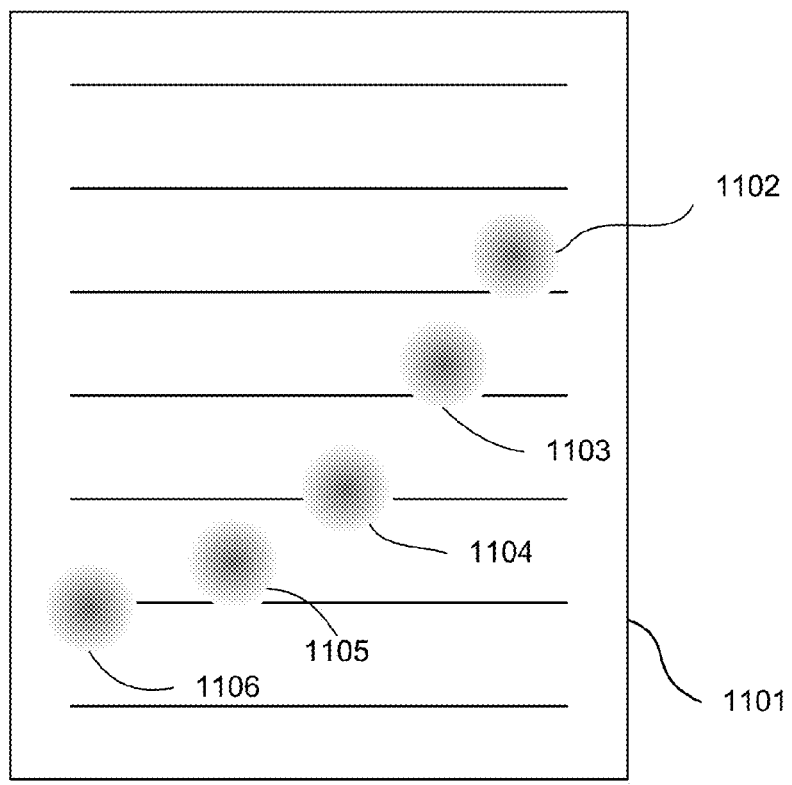
FIG. 11 is a schematic diagram of a playback touch gesture.
Figure 11:
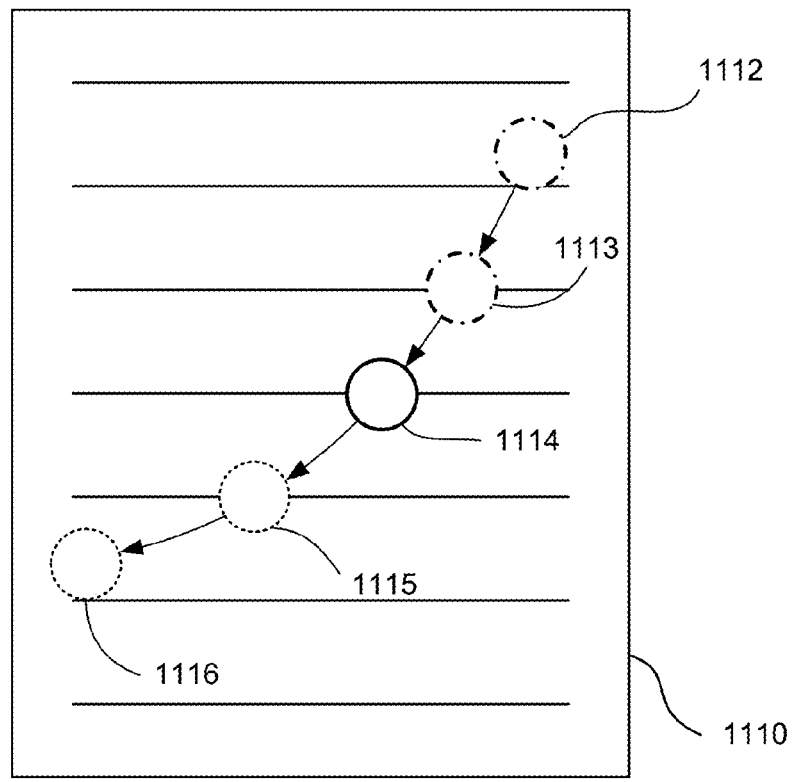

Once the coverage regions have been selected, the user can view further details of the manipulations within each coverage region by selecting a specific region. For example, in the case of region 507 in view 501 in FIG. 5, when a user touches the area of the screen on his/her mobile computing device (for example device 200 in FIG. 2), details of the manipulations contained within the coverage region 507 are revealed. As previously mentioned, these manipulations may be any of digital ink or gestural marks in addition to any audio notes (note that any digital ink or gestural marks would undoubtedly require the document state data for their placement in respect of the page being viewed). Thus region 507 may reveal a trace gestural mark, such as that shown in view 1101 in FIG. 11. Traces of the gestures 1102 to 1106 can be rendered as coloured trails or a simplified highlighted region. In this example traces 1102 to 1106 represent finger marks of the gesture creating entity. These finger marks may have been created by an entity when moving visually moving the document while giving a speech. In a further example, whole-hand gestures would be drawn as a shadow of the hand. Selecting a trace enables a user to initiate a playback of the gesture. In the case of a trace gestural mark as shown in view 1101 in FIG. 11, a playback means that the manner in which the trace was made relative to time is played back to be viewed by the user. This enables the user to fully understand the reason the creating entity was hovering over a specific section of the page (perhaps indicating paragraphs of the viewed document that are important).

When playback is occurring, gestures are rendered similar to how they were created. For example, gestures based on touch points are drawn as moving points. This is depicted in view 1110 in FIG. 11 which reflects the trace gesture 1102 to 1106. In view 1110, the traces 1112 to 1116 were created time-sequentially in that trace 1112 was created first, and trace 1116 was created last. Thus when a user selects a trace, the sequence in which traces 1112 to 1116 were created by an entity are played back in that order in an animation, as indicated by the arrows in view 1110 in FIG. 11. Pausing playback shows the visualization of all segments of the current gesture being played back as coloured (shown as with a solid line in trace 1114 of view 1110) or whether it had already been seen (shown with a dot-line in traces 1112 and 1113 of view 1110) or if it will occur later in playback (shown with a dash in traces 1115 and 1116 of view 1110). Additionally, any audio that was also recorded by the creating entity at the time of making the trace can also be played back during the animation.

Figure 12:
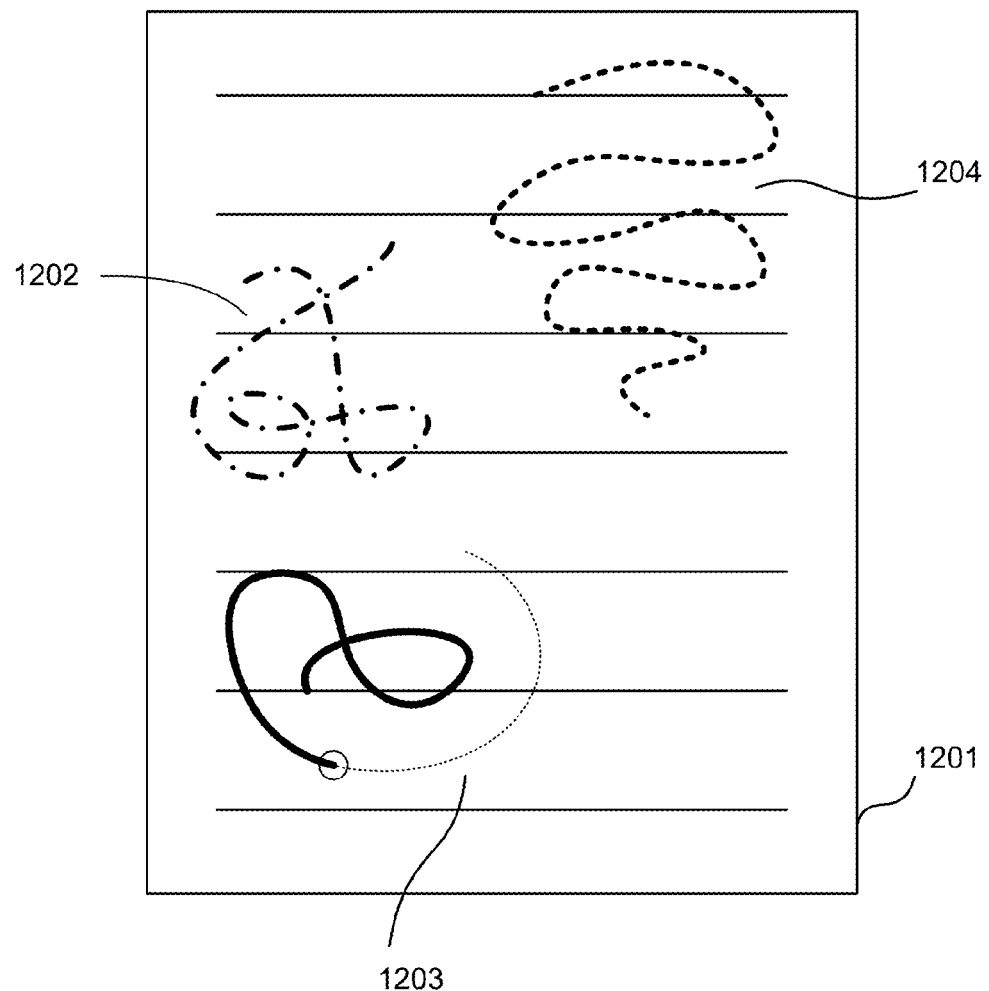
FIG. 12 is a schematic diagram of a playback of trace gestures.

A further example of playback with respect to digital ink marks made within a selected coverage region is shown in FIG. 12. This shows view 1201 of a document in which digital ink marks 1202 to 1204 have been made by a creating entity using a stylus pen, ink mark 1202 being created before mark 1204. When a user selects the ink marks, playback of the ink marks is initiated in the sequence with which they were created. In this example, ink mark 1202 has already been played back to the user, as shown by the dot-line line type. Ink mark 1204 has yet to be played back to the user, as is indicated by the dashed line type. Ink mark 1203 has been played back to the user, in part, the solid line indicating the portion of the ink mark 1203 that has been played back in animation, while the faint line depicts the portion of the ink mark that has yet to be played back. As with trace marks, any audio that was also recorded by the creating entity at the time of making the digital ink mark with a stylus pen can also be played back during the animation.

Figure 13:
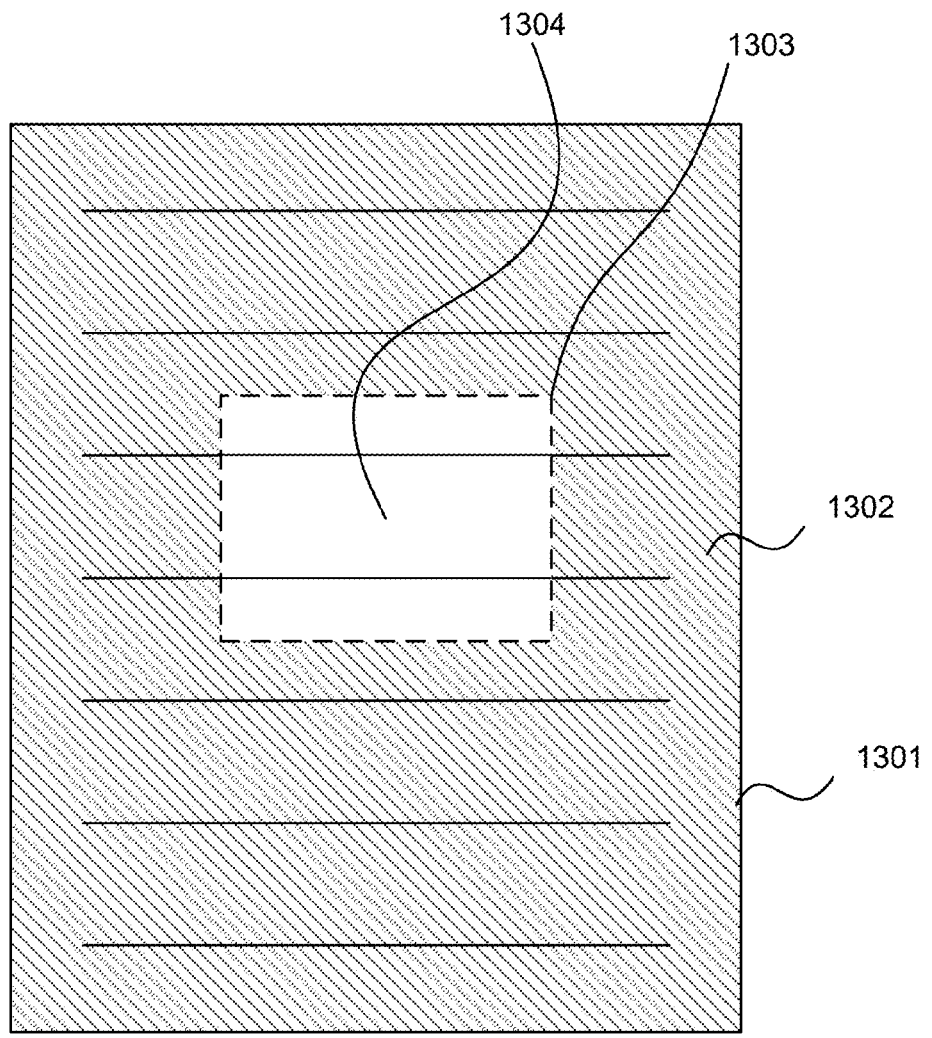
FIG. 13 is a schematic diagram of a visible region when a document is in fixed view mode.

FIG. 13 depicts yet another view 1301 of a document page with a selected coverage region. In this example, the creating entity has not made any gestural or ink marks. Rather, a selected region of the page has been zoomed into in a fixed mode view. This is displayed to the user by shading 1302 the rest of the page, leaving only the zoomed-in section 1304 visible to the user; this is marked by the dashed rectangle 1303. As with trace marks and digital ink marks, any audio that was also recorded by the creating entity at the time of zooming-in to the document can also be played back during the animation. When playing back in fixed viewpoint mode, the portion of the document that is visible stays static.

Figure 14:
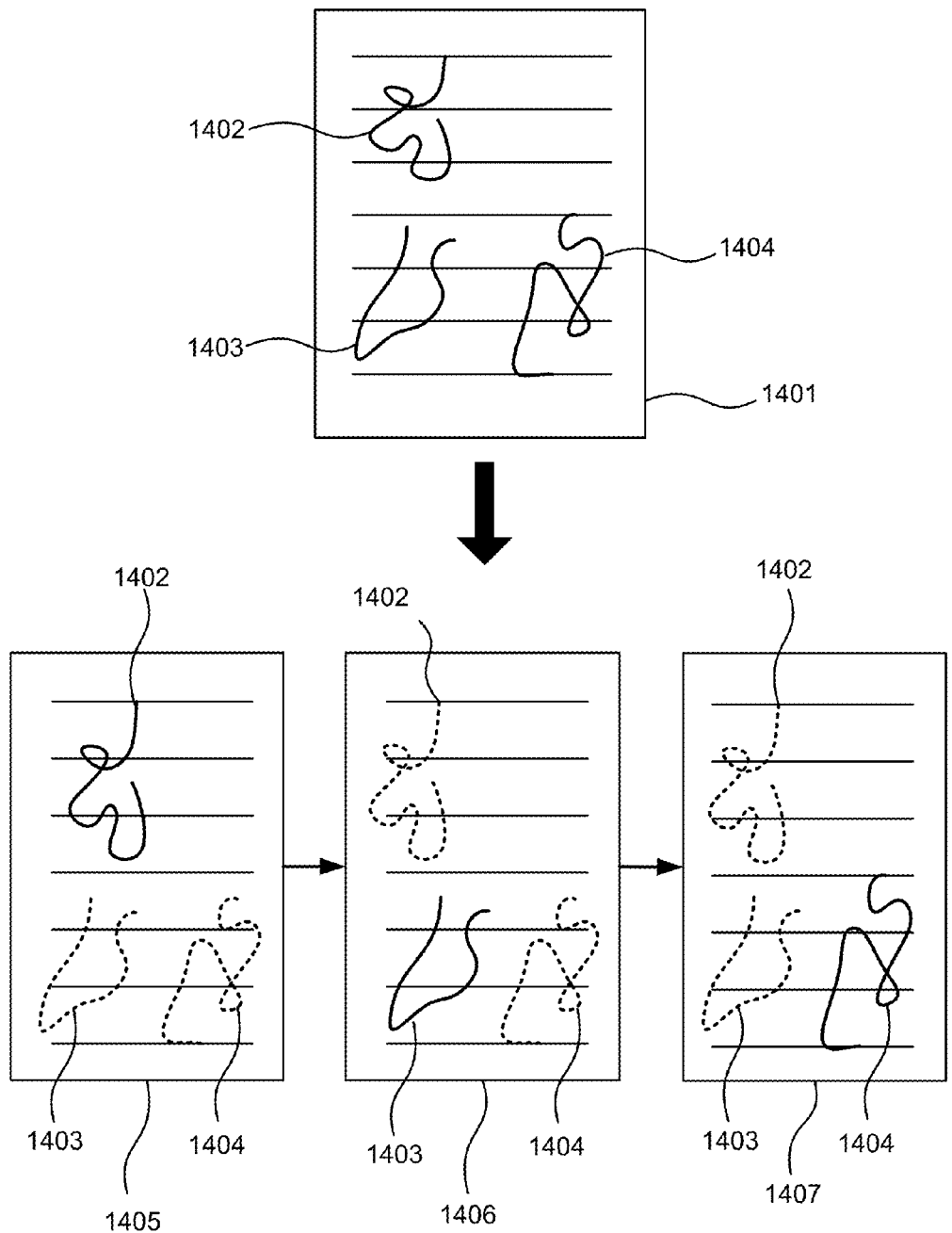
FIG. 14 is a schematic diagram of a gestural annotation storyboard.

A lengthy recording consisting of many manipulations (e.g. gesture marks and digital ink marks) can be simplified into storyboard form. Groups of marks that occur within a specific time window can be shown simultaneously, as illustrated in FIG. 14. Here the user is presented with document views 1401, and 1405 to 1407 in which the sequence in which manipulations are made is shown stage by stage. For example, all the manipulations 1402 to 1404 are shown in the selected view 1401. The manipulations shown here are digital ink marks, however any other manipulations and a mix thereof may be present. Instead of an animated playback as previously described, the user has the option of being presented with a storyboard comprising multiple frames of the same viewed document 1401, shown in the order in which the manipulations were made. Thus in view 1405, marks 1403 and 1404 are shown as dashed lines indicating that only mark 1402 was made at that instant; in view 1406, marks 1402 and 1404 are shown as dashed lines indicating that only mark 1403 was made at that instant; similarly in view 1407, marks 1402 and 1403 are shown as dashed lines indicating that only mark 1404 was made at that instant.

This method of splitting the playback into a sequence of frames helps to reduce clutter while providing an easy-to-follow narrative of events. View controlling gestures can be represented using representative symbols like arrows to indicate panning and rectangles to indicate the regions of zooming.

Figure 15:
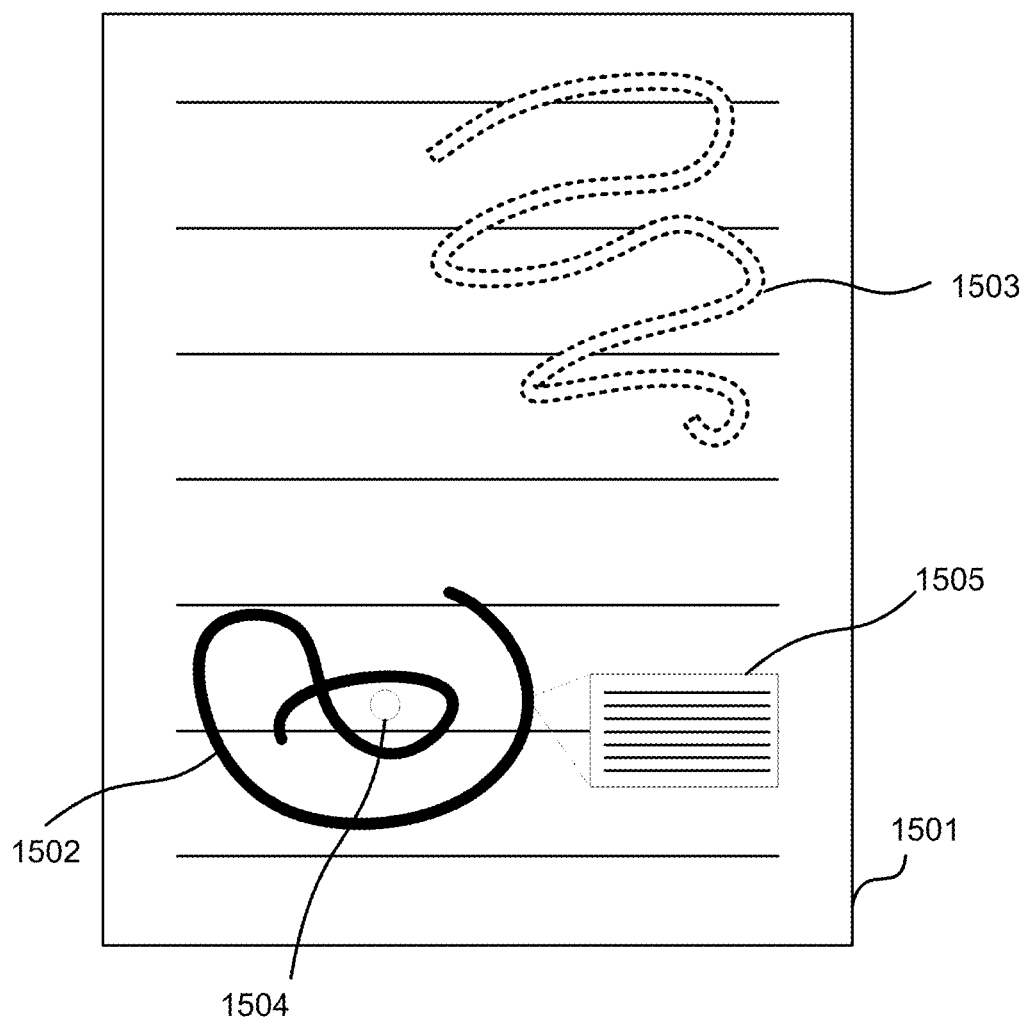
FIG. 15 is a schematic diagram of hovering over a gesture trace to get a transcript of speech at that point.

The method time stamps all manipulations and links these marks with transcriptions of any audio marks using time-stamps stored in metadata in the modified data streams generated by the creating entities. FIG. 15 shows two ink marks 1502 and 1503, of which only ink mark 1502 is displayed at that instant. When the user selects or hovers over the gesture at a certain location, such as location 1504, a window 1505 pops up allowing the user to preview any verbal dialog created by an entity at the point in time when the ink mark 1502 was made. This selection may be made by a finger touch by a user onto the surface of his mobile computing device, such as device 200 in FIG. 2. Tapping on the same location jumps the playback of audio and digital ink marks together to that time point. In other examples, selecting an ink annotation will show the speech and gestures that were created alongside the ink annotation.

In the textual transcripts of the audio stream, colours and highlighting are used to indicate when the ink and gestural marks were applied so that users who are skimming speech annotations by reading have an idea of when specific digital ink or gestural marks were created.

As defined herein, computer storage media does not include communication media. Therefore, a computer storage medium should not be interpreted to be a propagating signal per se. Propagated signals may be present in a computer storage media, but propagated signals per se are not examples of computer storage media.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method at a computing device comprising:
   rendering, by an application that at least one of reads or writes documents, a document at a display device, the application executing on the computing device or at a remote computing entity in communication with the computing device;
   receiving sensor data from one or more sensors monitoring user annotation events associated with the rendered document, whilst also,
   monitoring state data of the application;
   recognizing one or more gestures by analyzing the received sensor data;
   storing the state data with associated timestamps;
   storing the recognized gestures with associated timestamps; and
   calculating and storing a compressed record of the sensor data on the basis of the recognized gestures, the state data, and the timestamps, wherein the compressed record of the sensor data comprises identifiers of a plurality of views of the document having associated recognized gestures, the plurality of views of the document together forming a storyboard.

2. The method according to claim 1, wherein the compressed record of the sensor data comprises thumbnail image locations of one or more coverage regions of a gesture with respect to one or more thumbnail images of parts of the document.

3. The method according to claim 1, wherein the compressed record of the sensor data comprises locations within the document of one or more presence marks which may be used to indicate presence of a gesture with respect to the document.

4. The method according to claim 1, wherein the compressed record of the sensor data comprises the location and size of a region in the document which is associated with one of the recognized gestures, and where that recognized gesture is known to control manipulation of the document in the application.

5. The method according to claim 1, wherein the compressed record of the sensor data comprises identifiers indicating whether the recognized gestures are known to control manipulation of the document in the application.

6. The method according to claim 1, wherein the sensor data comprises one or more of: touch sensor data, image data, or audio data.

7. The method according to claim 1 wherein the compressed record of the sensor data further comprises metadata describing the sensor data.

8. The method according to claim 7 wherein the metadata comprises any of: an identifier of the user, or a location of the computing device.

9. The method according to claim 1, wherein the compressed record of the sensor data further comprises an animation of at least part of one of the recognized gestures.

10. The method according to claim 1, wherein the sensor data comprises touch sensor data and the compressed record of the sensor data further comprises electronic ink identifiers.

11. The method according to claim 1, wherein the sensor data comprises audio sensor data and the compressed record of the sensor data further comprises a transcript of speech of the user calculated from the audio sensor data.

12. The method according to claim 1 wherein the sensor data comprises audio sensor data and the compressed record of the sensor data further comprises identifiers of audio annotations of the user.

13. A method at a computing device comprising:
rendering a document at a display device using output of an application which is executing on the computing device or at a remote computing entity in communication with the computing device, the application configured to at least one of read or write documents;
accessing a compressed record of sensor data, the sensor data being from one or more sensors that monitored first user annotation events associated with the rendered document, the compressed record of sensor data comprising information about gestures recognized from the sensor data, state data of the application at the time of sensing the sensed data, identifiers of a plurality of views of the document having associated recognized gestures, and timestamps of the sensed data and of the state data;
using the compressed record of sensor data to enable a second user to consume the annotation events in conjunction with the rendered document, wherein using the compressed record includes displaying the plurality of views of the document as a storyboard.

14. A method according to claim 13 wherein the compressed record of the sensor data comprises thumbnail image locations of one or more coverage regions of a gesture with respect to one or more thumbnail images of parts of the document; and using the compressed record comprises displaying the coverage regions overlaid on the thumbnail images.

15. A method according to claim 13 wherein:
the compressed record of the sensor data comprises metadata describing the sensor data; and
using the compressed record further includes searching the document on the basis of the metadata.

16. A computing device comprising:
one or more processors arranged to render a document at a display device using output of an application which is executing on the computing device or at a remote computing entity in communication with the computing device, the application configured to at least one of read or write documents;
one or more sensors monitoring user annotation events associated with the rendered document;
the one or more processors arranged to monitor state data of the application during monitoring of the annotation events by the sensors;
a gesture recognition component arranged to recognize gestures by analyzing the received sensor data; and
a memory storing the state data with associated timestamps, the memory storing the recognized gestures with associated timestamps;
the one or more processors arranged to calculate a compressed record of the sensor data on the basis of the recognized gestures, the state data, and the timestamps;
the one or more processors arranged to display representations of the recognized gestures superimposed on representations of portions of the rendered document associated with the recognized gestures, wherein individual ones of the representations of the recognized gestures are distinguishable from each other.

17. A computing device according to claim 16 the sensors comprising one or more of: a camera, a touch sensor, or a microphone.

18. A computing device according to claim 16 the gesture recognition component being at least partially implemented using hardware logic selected from any one or more of: a field-programmable gate array, a program-specific integrated circuit, a program-specific standard product, a system-on-a-chip, a complex programmable logic device, or a graphics processing unit.

19. A computing device according to claim 16, wherein the recognized gestures are associated with the portions of the rendered document by commands associated with the recognized gestures that operated on the portions of the rendered document.

* * * * *